(12) United States Patent
Li et al.

(10) Patent No.: US 12,186,907 B2
(45) Date of Patent: Jan. 7, 2025

(54) DYNAMIC USE OF ARTIFICIAL INTELLIGENCE (AI) MODELS ON AN AUTONOMOUS AI ENABLED ROBOTIC DEVICE

(71) Applicant: International Business Machines Corporation, Armonk, NY (US)

(72) Inventors: Jenny S. Li, Cary, NC (US); Raghu Ramaswamy, Bangalore (IN); Nirmit V Desai, Yorktown Heights, NY (US); Dhiraj Joshi, Edison, NJ (US); Satish Rajani, Dewas (IN); Nancy Anne Greco, Lagrangeville, NY (US); Shiva G, Nagar (IN); Aakash Praliya, Kota (IN); Wei-Han Lee, White Plains, NY (US); Luis Angel Bathen, Placentia, CA (US); Tova Roth, Woodmere, NY (US); Sujoy Kumar Roy Chowdhury, Kolkata (IN); Prakriti Pritmani, Ahmedabad (IN); Kay Murphy, Nebo, NC (US); Shilpa Shenai, Bengaluru (IN); Arun Yashwant Ingale, Pune (IN); Ajjay Ratnakar, Bangalore (IN); Gwilym Benjamin Lee Newton, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 17/452,247

(22) Filed: Oct. 26, 2021

(65) Prior Publication Data

US 2023/0126457 A1    Apr. 27, 2023

(51) Int. Cl.
*B25J 9/16* (2006.01)
*B25J 13/08* (2006.01)

(52) U.S. Cl.
CPC ............... *B25J 9/163* (2013.01); *B25J 9/162* (2013.01); *B25J 13/082* (2013.01); *B25J 13/089* (2013.01)

(58) Field of Classification Search
CPC . B25J 9/163; B25J 9/162; B25J 13/082; B25J 13/089; G05D 1/0088; G05D 1/0011
See application file for complete search history.

(56) References Cited

U.S. PATENT DOCUMENTS 8,112,176 B2    2/2012  Solomon
8,812,154 B2    8/2014  Lyle
(Continued)

FOREIGN PATENT DOCUMENTS

WO    2017081029 A2    5/2017

OTHER PUBLICATIONS

"Adaptive audio adjustment tone modulation in Cognitive Robots", An IP.com Prior Art Database Technical Disclosure, Disclosed Anonymously, IP.com No. IPCOM000255040D, IP.com Electronic Publication Date: Aug. 28, 2018, 6 pages.
(Continued)

*Primary Examiner* — Mohammad K Islam
(74) *Attorney, Agent, or Firm* — Michael A. Petrocelli

(57) ABSTRACT

Dynamically adjusting, using artificial intelligence (AI), sensors and models of an autonomous roaming robotic device, which includes receiving data regarding an asset at a computer of a roaming robotic device from sensors on the robotic device. The robotic device identifies an asset at a location using the sensors, and the robotic device has instructions, received from a control system, to inspect the location or items at the location. The data is analyzed using the computer of the robotic device, and the analysis includes using historical data for the asset. An AI model is loaded using the computer of the robotic device, based on the
(Continued)

identification of the asset. A sensor is selected using the computer of the robotic device, for conducting an inspection of the asset based on the analysis of the data and the AI model.

20 Claims, 11 Drawing Sheets

(56) References Cited

U.S. PATENT DOCUMENTS

| | | | |
|---|---|---|---|
| 10,682,677 | B2 | 6/2020 | Sen |
| 11,068,991 | B2 | 7/2021 | Przechocki |
| 11,086,315 | B2 | 8/2021 | Dundorf |
| 11,830,203 | B2* | 11/2023 | Yu .......................... G06N 3/084 |
| 2018/0319015 | A1* | 11/2018 | Sinyavskiy .......... G05D 1/0088 |
| 2021/0046642 | A1* | 2/2021 | Luis y Prado ....... B25J 11/0055 |
| 2022/0415059 | A1* | 12/2022 | Smolyanskiy ..... B60W 60/0011 |
| 2023/0089452 | A1* | 3/2023 | Meagher ............ B60W 60/0011 701/26 |

OTHER PUBLICATIONS

"Autonomous Garden Path Groomer", An IP.com Prior Art Database Technical Disclosure, Disclosed Anonymously, IP.com No. IPCOM000259970D, IP.com Electronic Publication Date: Oct. 4, 2019, 4 pages.

"Method and System for Providing a Dynamic Modelling Framework for an Artificial Intelligence Based Robotic Interviewer", An IP.com Prior Art Database Technical Disclosure, Disclosed Anonymously, IP.com No. PCOM000256312D, IP.com Electronic Publication Date: Nov. 17, 2018, 3 pages.

Beloev, et al., "Artificial Intelligence-Driven Autonomous Robot for Precision Agriculture", Acta Technologica Agriculturae 1, Nitra, Slovaca Universitas Agriculturae Nitriae, 2021, pp. 48-54.

Dasanayaka, et al., "Use of Artificial Intelligence for Autonomous Military Robots", Proceedings of the 9th International Conferences on Advances in Computing, Control and Networking (ACCN), 2019, pp. 82-89.

Mell, et al., "The NIST Definition of Cloud Computing", National Institute of Standards and Technology, Special Publication 800-145, Sep. 2011, 7 pages.

Piltan, Farzin, "Adaptive Artificial Intelligence Based Model Base Controller: Applied to Surgical Endoscopy Telemanipulator", International Journal of Intelligent Systems and Applications, Aug. 2013, 09, pp. 103-115.

* cited by examiner

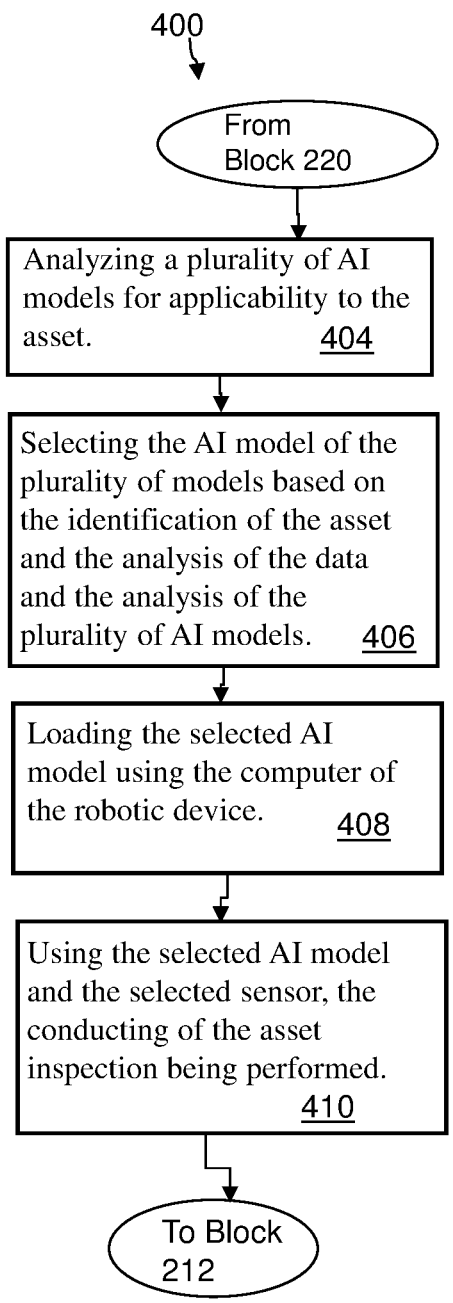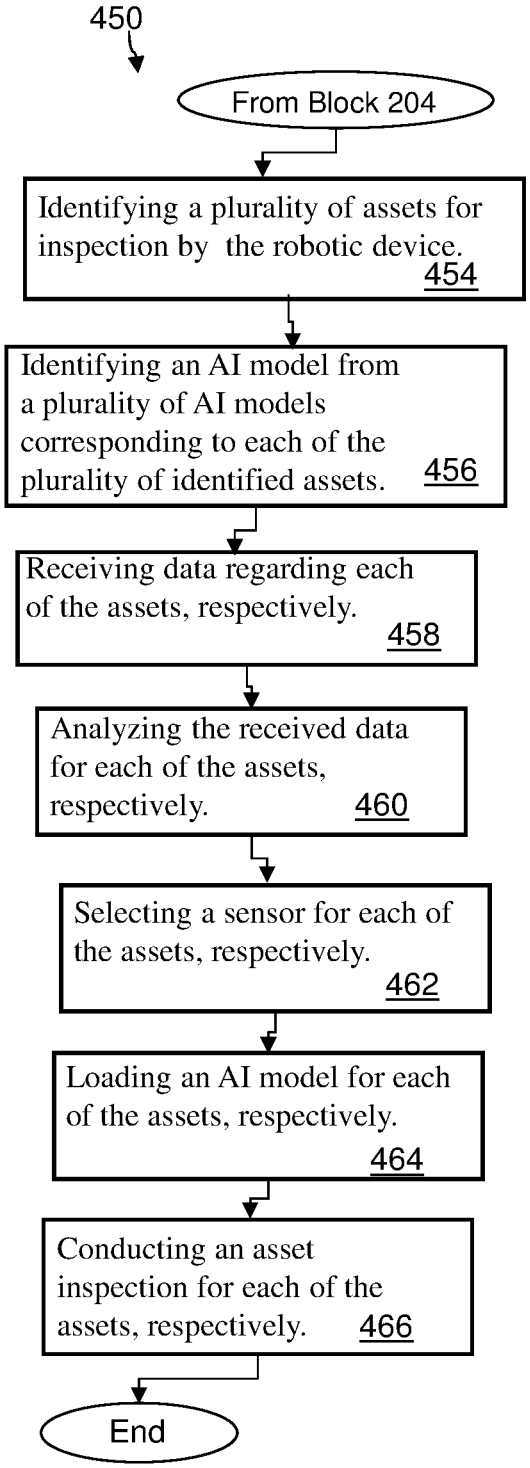
FIG. 4A
FIG. 4B

DYNAMIC USE OF ARTIFICIAL INTELLIGENCE (AI) MODELS ON AN AUTONOMOUS AI ENABLED ROBOTIC DEVICE

BACKGROUND

The present disclosure relates to using Artificial Intelligence (AI) models on an AI enabled autonomous roaming robotic device, and more specifically, using AI for adaptive sensing and model selection for a roaming edge device.

In one example, a human such as an operator can record or define a mission for the robot, and the robot can execute the mission. In one example, a roaming edge devices (RED) (such as a robotic device) can be used to navigate in a location and complete assigned tasks. In one example, the device can assist in inspections or maintenance in manufacturing. The device can be given a specific mission to perform an inspection, for instance, it can be pre-programmed to a specific location to do the same type of inspection on the same type of assets. For example, a first mission can involve a first robot to perform visual inspection of a number of fire extinguishers, and a second mission can involve a second robot to investigate a sounds coming from a heating and air conditioning (HVAC) system on the ground floor. In this example, even though the number of fire extinguishers and the HVAC are in the same floor, the robot still needs to make two trips. Thus, the robot an execute the pre-programed mission and typically does not alter the mission or implement decision making at the robotic device. Thus, one issue with current robotic device systems is an inefficiency related to robotic tasks or missions.

SUMMARY

The present disclosure recognizes the shortcomings and problems associated with current techniques for Artificial Intelligence (AI) enabled adaptive navigation for enhancing task performance for an autonomous roaming robotic device, and more specifically, optimizing sensing capabilities for a mobile robotic device, e.g., a roaming edge device (RED).

In one example, current robotic devices do not provide flexibility for a robotic device that is equipped with multiple sensors to perform multiple AI workloads within the same mission or trip. Methods and systems of the present invention can allow the robot to dynamically switch to using different sensors and run different AI workloads as needed. According to the present invention, the robotic device can determine by itself what sensors to use and the corresponding AI models to use for inferencing, that is, determining a sensor. Thus, the present invention enables the robot, using AI, to intelligently determine what sensors to use by itself, that is determine a sensor to use, initiate the selected sensor, and receive data from the selected sensor at the robotic device.

In an aspect according to the present invention, a computer-implemented method for an autonomous roaming robotic device to dynamically adjust actions and models for actions using artificial intelligence (AI), which includes receiving data regarding an asset at a computer of a roaming robotic device from one or more sensors of a plurality of sensors on the robotic device, in response to an identification of the asset at a location using the one or more sensors. The robotic device has instructions, received from a control system, to inspect the location or items at the location. The method includes analyzing the received data and historical data for the asset, using the computer of the robotic device, to reference relevant inspection instructions and an inspection history for the asset. The method includes selecting a sensor of the plurality of sensors, using the computer of the robotic device, based on the analysis of the data. The method includes loading an AI model using the computer of the robotic device, based on the identification of the asset and the analysis of the data; and conducting an asset inspection based on the AI model using the selected sensor to generate asset inspection data.

In a related aspect, the method further includes analyzing a plurality of AI models for applicability to the asset; selecting the AI model of the plurality of models based on the identification of the asset and the analysis of the data and the analysis of the plurality of AI models; loading the selected AI model using the computer of the robotic device; using the selected AI model and the selected sensor, the conducting of the asset inspection being performed.

In a related aspect, the AI model can include an inspection protocol for the asset.

In a related aspect, the method further includes selecting a sensor of the plurality of sensors, using the computer of the robotic device, for conducting an inspection of the asset based on the AI model; and performing an asset inspection using the selected sensor to generate asset inspection data, based on the AI model for the asset.

In a related aspect, the method can include determining an action with respect to the asset based on the asset inspection data; and communicating the action to the control system.

In a related aspect, the inspection protocol can include an inspection type, and an inspection action particular to the inspection type.

In a related aspect, the method can include analyzing the asset inspection data from the asset inspection using the computer of the robotic device; and determining a next action based on the analysis of the asset inspection data.

In a related aspect, the method can further include initiating the next action at the robotic device, the next action including a second sensor of the plurality of sensors on the robotic device.

In a related aspect, the method further includes enabling a third sensor of the plurality of sensors based on a type of the asset; loading a related AI model input for the type of the asset for the generation of the AI model; capturing the inspection data with the third sensor; analyzing the inspection data to determine determining another action based on the analysis of the asset inspection data; and initiating the next action at the robotic device, the next action including a second sensor of the plurality of sensors on the robotic device.

In a related aspect, the method further including identifying a plurality of assets for inspection by the robotic device; identifying an AI model from a plurality of AI models corresponding to each of the plurality of identified assets; receiving data regarding each of the assets, respectively; analyzing the received data for each of the assets, respectively; selecting a sensor for each of the assets, respectively; loading an AI model for each of the assets, respectively; and conducting an asset inspection for each of the assets, respectively.

In a related aspect, the selection of the sensor is performed by the computer of the robotic device without instructions from the control system regarding the selection.

In a related aspect, the computer of the robotic device initiates the conducting of the asset inspection based on an inspection protocol derived from the AI model, and the conducting of the asset inspection by the robotic device is in response to the computer of the robotic device.

In a related aspect, the computer of the robotic device initiates the performance of the conducting of the asset inspection in response to the AI model.

In a related aspect, the selection of the sensor and the conducting of the asset inspection is not initiated in response to the control system.

In a related aspect, the method further including identifying a second asset at the location using the one or more sensors of the plurality of sensors on the roaming robotic device; receiving data at the computer of the robotic device from the one or more sensors regarding the second asset, in response to the identification of the second asset at the location; analyzing the second data using the computer wherein the analysis includes using historical data for the second asset; generating another AI model based on the identification of the second asset, using the analysis of the second data; analyzing the another AI model to generate a second inspection protocol for the second asset; selecting a second sensor from the plurality of sensors for initiating the inspection of the second asset based on the second inspection protocol; perform a second asset inspection using the selected second sensor to generate second asset inspection data; determining a second action with respect to the second asset based on the second asset inspection data; and communicating the second action to the control system.

In a related aspect, the action includes an alert regarding the asset.

In a related aspect, the action including a communication to a device of a person.

In a related aspect, the action including a maintenance activity for the asset.

In another aspect according to the present invention, a system using a computer for an autonomous roaming robotic device to dynamically adjust sensors and models for implementing actions using artificial intelligence (AI) can include a computer system. The computer system can include; a computer processor, a computer-readable storage medium, and program instructions stored on the computer-readable storage medium being executable by the processor, to cause the computer system to perform the following functions to; receive data regarding an asset at a computer of a roaming robotic device from one or more sensors of a plurality of sensors on the robotic device, in response to an identification of the asset at a location using the one or more sensors, the robotic device having instructions, received from a control system, to inspect the location or items at the location; analyze the received data and historical data for the asset, using the computer of the robotic device, to reference relevant inspection instructions and an inspection history for the asset; select a sensor of the plurality of sensors, using the computer of the robotic device, based on the analysis of the data; load an AI model using the computer of the robotic device, based on the identification of the asset and the analysis of the data; and conduct an asset inspection based on the AI model using the selected sensor to generate asset inspection data.

In another aspect according to the present invention, a computer program product for an autonomous roaming robotic device to dynamically adjust sensors and models for implementing actions using artificial intelligence (AI) can include a computer readable storage medium having program instructions embodied therewith. The program instructions can be executable by a computer to cause the computer to perform functions, by the computer, comprising the functions to; receive data regarding an asset at a computer of a roaming robotic device from one or more sensors of a plurality of sensors on the robotic device, in response to an identification of the asset at a location using the one or more sensors, the robotic device having instructions, received from a control system, to inspect the location or items at the location; analyze the received data and historical data for the asset, using the computer of the robotic device, to reference relevant inspection instructions and an inspection history for the asset; select a sensor of the plurality of sensors, using the computer of the robotic device, based on the analysis of the data; load an AI model using the computer of the robotic device, based on the identification of the asset and the analysis of the data; and conduct an asset inspection based on the AI model using the selected sensor to generate asset inspection data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 4A is a flow chart illustrating another method, which continues from the flow chart of FIG. 2, for an autonomous roaming robotic device to dynamically adjust sensors and models for implementing actions using artificial intelligence (AI), including an AI model and data analysis.

FIG. 4B is a flow chart illustrating another method, which continues from the flow chart of FIG. 2, for an autonomous roaming robotic device to dynamically adjust sensors and models for implementing actions using artificial intelligence (AI), including an AI model and data analysis.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions of illustrate and explain further examples and embodiments according to the present disclosure.

Figure 1:
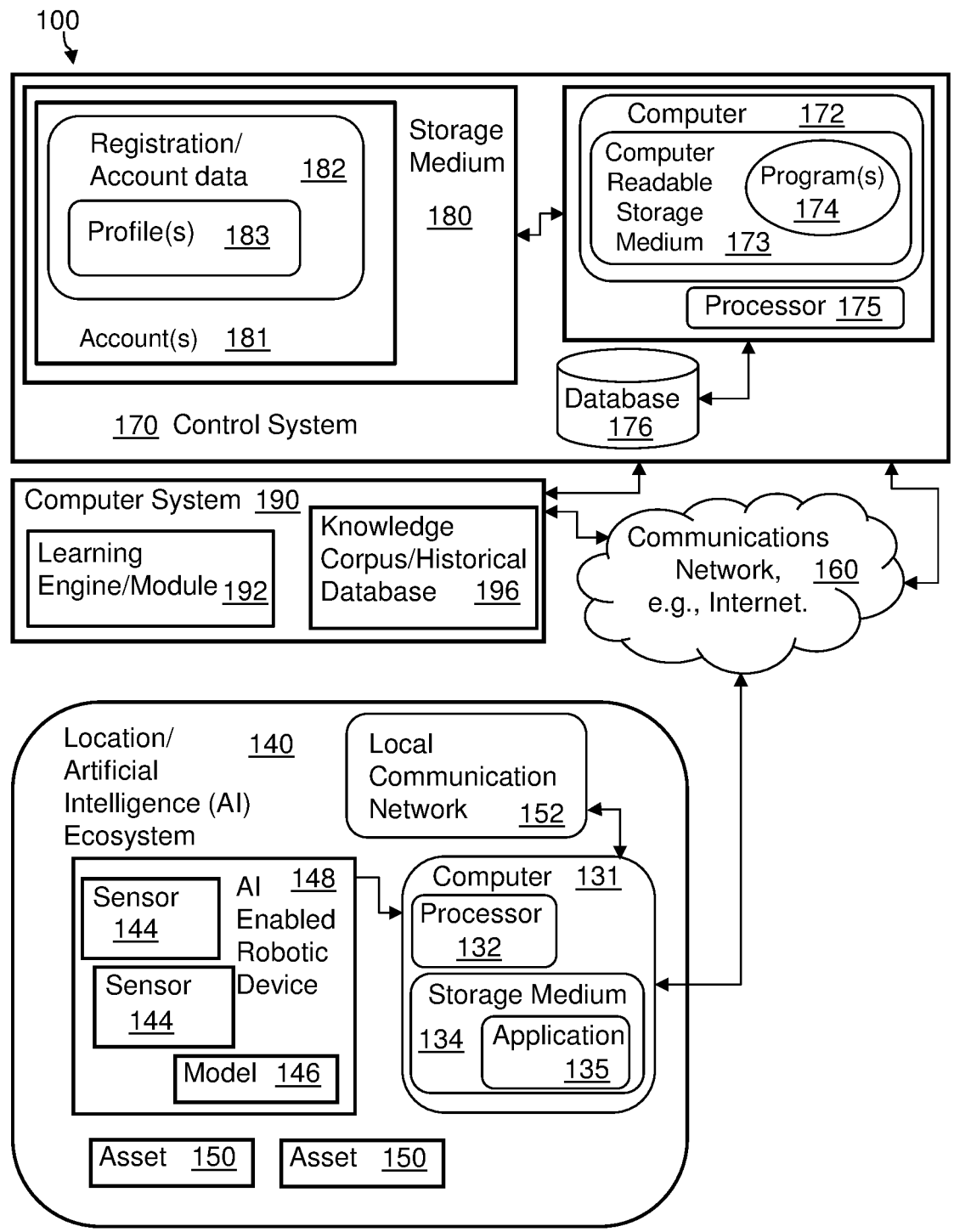
FIG. 1 is a schematic block diagram illustrating an overview of a system, system features or components, and methodology for an autonomous roaming robotic device to dynamically adjust sensors and models for implementing actions using artificial intelligence (AI), according to an embodiment of the present disclosure.
Figure 2:
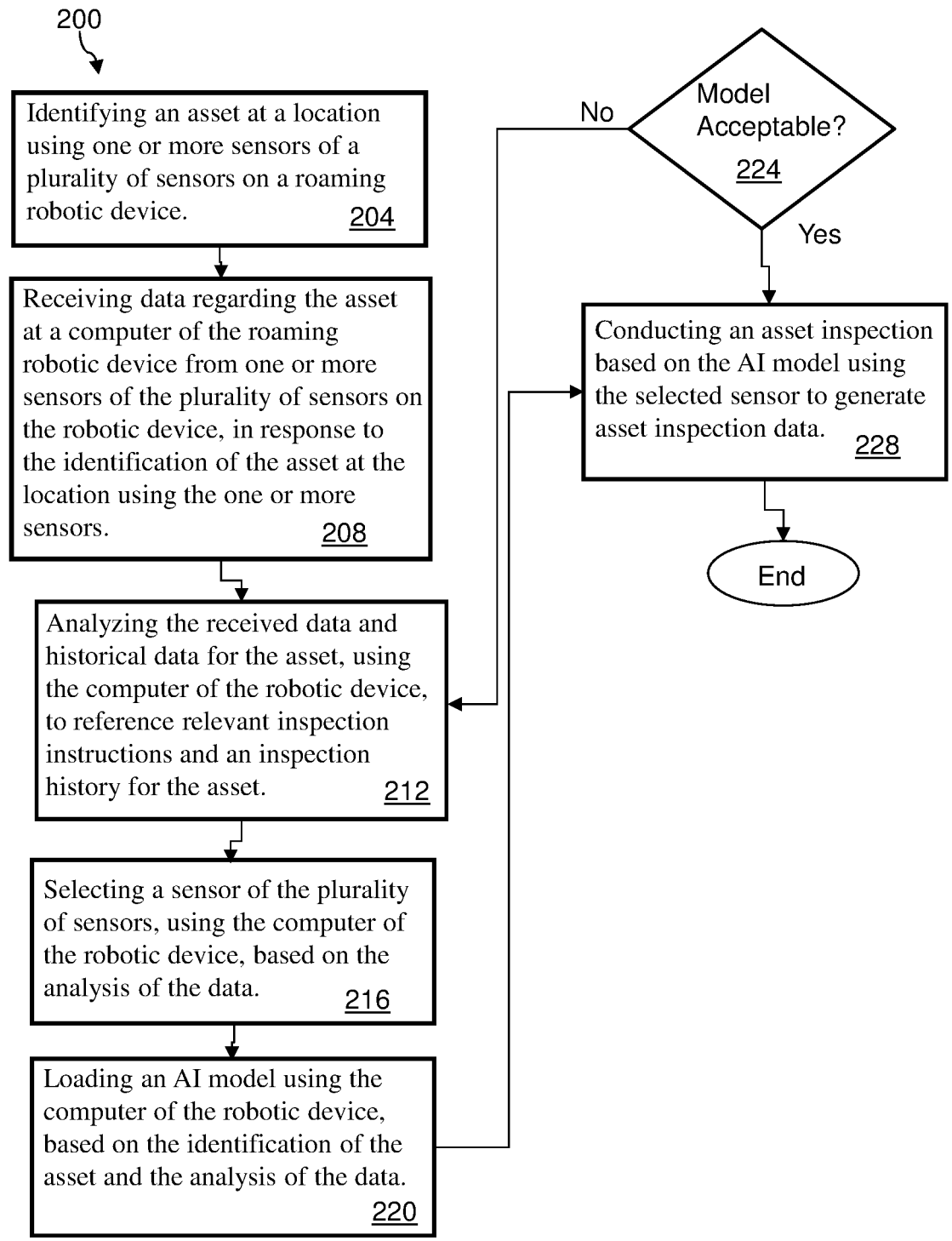
FIG. 2 is a flow chart illustrating a method, implemented using the system shown in FIG. 1, for an autonomous roaming robotic device to dynamically adjust sensors and models for implementing actions using artificial intelligence (AI), including an AI model and data analysis, according to an embodiment of the present disclosure.
Figure 3:
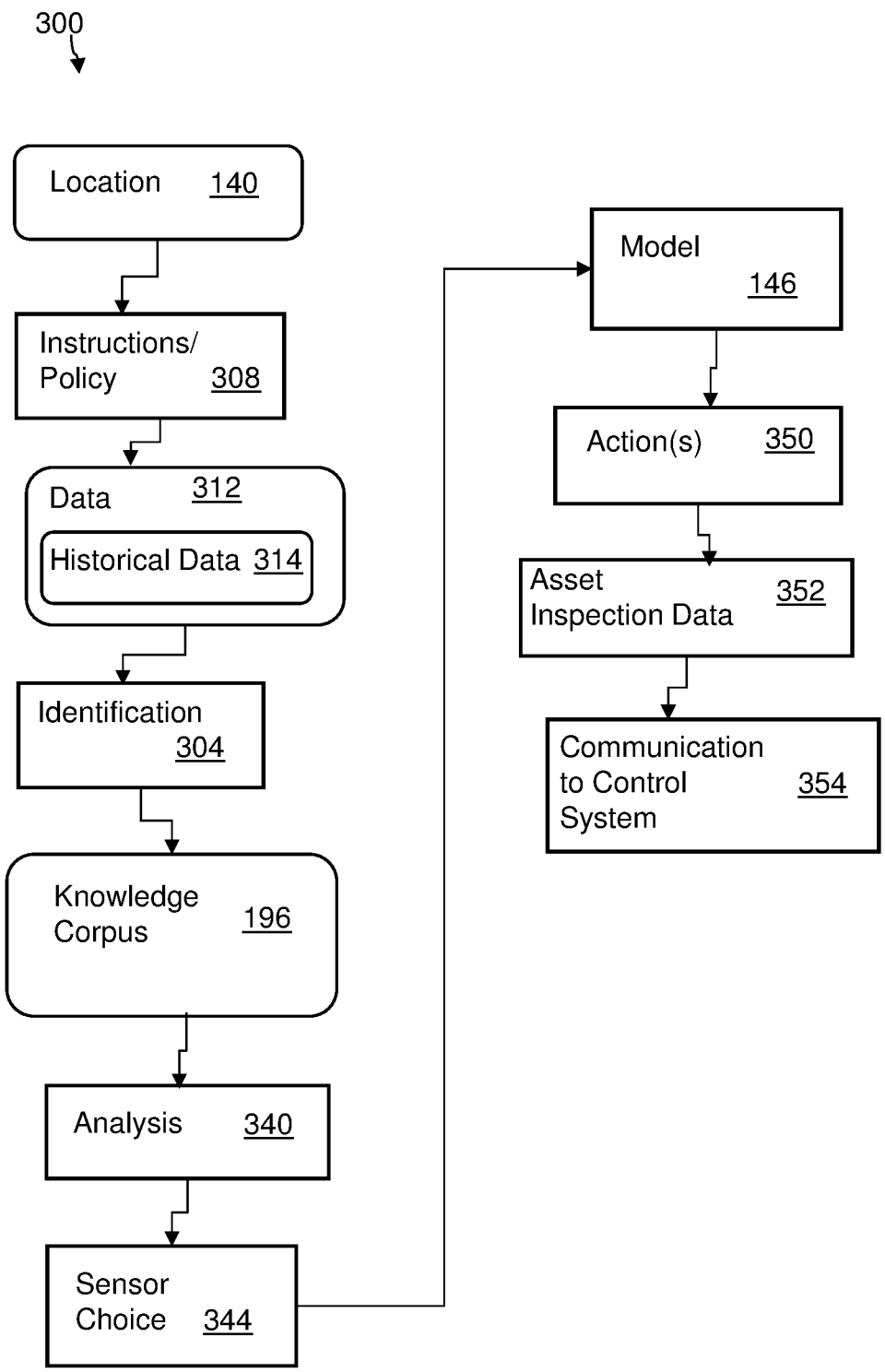
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for an autonomous roaming robotic device to dynamically adjust sensors and models for implementing actions using artificial intelligence (AI), including an AI model and data analysis.

Referring to FIGS. 1, 2 and 3, according to embodiments of the present disclosure, a computer-implemented method 200 for optimizing sensing capabilities of a roaming robotic device (or a robot) using Artificial Intelligence (AI) includes features described below. Embodiments of the present disclosure include operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes identifying an asset 150 at a location 140 using one or more sensors 144 of a plurality of sensors on a roaming robotic device 148, as in block 204. The robotic device can include a computer 131 having AI capabilities for generating computer models, and the robotic device has instructions 308, received from a control system 170 communicating with the robot, to inspect a location or items at a location.

The method 200 includes receiving data 312 regarding the asset 150 at a computer 131 of the roaming robotic device 148 from one or more sensors 144 of the plurality of sensors on the robotic device, in response to the identification 304 of the asset 150 at the location using the one or more sensors, as in block 208.

The method includes analyzing 340 the received data 312 and historical data 314 for the asset, using the computer of the robotic device, to reference relevant inspection instructions and an inspection history for the asset, as in block 212. Such historical data can be stored in a knowledge corpus 196.

The method includes selecting 344 a sensor 144 of the plurality of sensors, using the computer of the robotic device, based on the analysis of the data, as in block 216.

The method includes loading an AI model 146 using the computer of the robotic device, based on the identification of the asset and the analysis of the data, as in block 220.

When the method determines that the model is not acceptable, at block 224, the method return to block 212. When the method determines that the model is acceptable, at block 224, the method continues to block 228.

The method includes conducting an action 350, for example, an asset inspection based on the AI model using the selected sensor to generate asset inspection data 352, as in block 228. In one example the method can communicate 354 to asset inspection data to the control system.

Referring to FIG. 4A, in another embodiment according to the present disclosure, a method 400 continues from block 220 of the method 200 shown in FIG. 2, includes analyzing a plurality of AI models for applicability to the asset, as in block 404. The method includes selecting the AI model of the plurality of models based on the identification of the asset and the analysis of the data and the analysis of the plurality of AI models, as in block 406. The method includes loading the selected AI model using the computer of the robotic device, as in block 408, and using the selected AI model and the selected sensor, the conducting of the asset inspection being performed, as in block 410. The method continues to block 212 of the method 200.

In another example, the AI model includes an inspection protocol for the asset. In another example, the method can include selecting a sensor of the plurality of sensors, using the computer of the robotic device, for conducting an inspection of the asset based on the AI model, and performing an asset inspection using the selected sensor to generate asset inspection data, based on the AI model for the asset. In another example, the method can include determining an action with respect to the asset based on the asset inspection data; and communicating the action to the control system. In yet another example, the inspection protocol includes an inspection type, and an inspection action particular to the inspection type. In another example, the includes loading a related AI model input for the identified asset for the generation of an AI model or simulation for use by the robot.

In another example, the method includes analyzing the asset inspection data from the asset inspection using the computer of the robotic device; and determining a next action based on the analysis of the asset inspection data. The method can include initiating the next action at the robotic device, and the next action can include a second sensor of the plurality of sensors on the robotic device. In one example, the analysis of the asset inspection data from the asset inspection, and determining a next action based on the analysis of the asset inspection data; and communicating the next action to the control system.

In another example, the method includes enabling a third sensor of the plurality of sensors based on a type of the asset. The method can include loading a related AI model input for the type of the asset for the generation of the AI model, and capturing the inspection data with the third sensor. The method can include analyzing the inspection data to determine determining another action based on the analysis of the asset inspection data. The method can include initiating the next action at the robotic device, the next action including a second sensor of the plurality of sensors on the robotic device.

Referring to FIG. 4B, in another method 450 according to the present disclosure, the method 450 continues from block 204 of the method 200 shown in FIG. 2, and the method includes identifying a plurality of assets for inspection by the robotic device, as in block 454.

The method 450 includes identifying an AI model from a plurality of AI models corresponding to each of the plurality of identified assets, as in block 456. The method 450 includes receiving data regarding each of the assets, respectively, as in block 458; and analyzing the received data for each of the assets, respectively, as in block 460. The method includes electing a sensor for each of the assets, respectively, as in block 462. The method further includes loading an AI model for each of the assets, respectively, as in block 464, and conducting an asset inspection for each of the assets, respectively, as in block 466.

The method can include the selection of the sensor being performed by the computer of the robotic device without instructions from the control system regarding the selection.

The method can include the computer of the robotic device initiating the conducting of the asset inspection based on an inspection protocol derived from the AI model, and the conducting of the asset inspection by the robotic device being in response to the computer of the robotic device.

The method can include the computer of the robotic device initiating the performance of the conducting of the asset inspection in response to the AI model. The method can include the selection of the sensor and the conducting of the asset inspection as not initiated in response to the control system.

The method can further include identifying a second asset at the location using the one or more sensors of the plurality of sensors on the roaming robotic device. The method can receive data at the computer of the robotic device from the one or more sensors regarding the second asset, in response to the identification of the second asset at the location. The method can analyze the second data using the computer wherein the analysis includes using historical data for the second asset. The method can generate another AI model based on the identification of the second asset, using the analysis of the second data. The method can analyze the another AI model to generate a second inspection protocol for the second asset. The method can select a second sensor from the plurality of sensors for initiating the inspection of the second asset based on the second inspection protocol. The method can perform a second asset inspection using the selected second sensor to generate second asset inspection data. The method can determine a second action with respect to the second asset based on the second asset inspection data; and communicate the second action to the control system.

In one example, the action includes an alert regarding the asset. In another example, the action including a communication to a device of a person. In another example, the action including a maintenance activity for the asset.

The computer 131 can be integral to or communicating with the robotic device 148 in a device 130. A computer 190 remote from the device 148 can electronically communicate, in all or in part, with the computer 172 as part of the control system 170. The control system can include the computer 172 having a computer readable storage medium 173 which can store one or more programs 174, and a processor 175 for executing program instructions. The control system can also include a storage medium which can include registration and/or account data 182 and profiles 183 of users or entities (such entities can include robotic entities) as part of user accounts 181. User accounts 181 can be stored on a storage medium 180 which is part of the control system 170. The user accounts 181 can include registrations and account data 182 and user profiles 183. The control system can also include a computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 131 of the device 130 and can be remote from the user device 130. In another example, the computer system 190 can be all or part of the control system, or all or part of the device 130. The depiction of the computer system 190 as well as the other components of the system 100 are shown as one example according to the present disclosure.

The new or different AI (Artificial Intelligence) ecosystem, or technology/communication or IT (Information Technology) ecosystem can include a local communications network 152 which can communicate with the communications network 160. The system 100 can include a learning engine/module 192, which can be at least part of the control system or communicating with the control system, for generating a model or learning model. In one example, the learning model can model workflow in a new AI or IT ecosystem for machine/devices in the new ecosystem.

In another example, the computer 131 can be part of a device 130. The computer can include a processor 132 and a computer readable storage medium 134 where an application 135 can be stored which can in one example, embody all or part of the method of the present disclosure. The application can include all or part of instructions to implement the method of the present disclosure, embodied in code and stored on a computer readable storage medium. The device 148 can include a display. The device 148 can operate, in all or in part, in conjunction with a remote server by way of a communications network 160, for example, the Internet.

The method includes analyzing 340 the received data using the control system for determining when the received data meets a threshold 344 for determining quality 346 of the data, in response to the receiving of the data from the robotic device in the location, as in block 208.

The method includes the analysis including generating a model 346 based on the received data, the model including vector representation of inputs detected by a sensor array 144 at the location, the inputs being at least part of the received data, as in block 212. A model can also be generated by an AI system such as an output at least in part of an AI system analysis using machine learning.

The method includes, in response to the received data at the control system not meeting the threshold for determining quality, the robotic device communicating with a cloud server such as a remote server 152 using cloud communications 150 to collaborate in updating 350 the policy to choose a navigation action 354, the cloud server being in communication with the robot at the location, as in block 220.

In another example, a cloud server communicable or communicating with the robot can have increased communication capabilities with the robot at the location in comparison to the control system. In another example, the method can include receiving data at the cloud system from the robot; and the received data as the cloud system meeting the threshold for determining quality of the data.

In one example, as part of the analysis of received data including data in the knowledge corpus and historical database 196, which can be populated by historical data gathered from sensors, mobile robots, and machines.

In one example, the robotic device can be a roaming edge device (RED) located at an edge of communications for roaming edge devices at the location. In another example, the robotic device can be at least semi-autonomous, and the robotic device can perform a task being initiated by the robotic device, without a communication for the task from the control system.

In another example, the task can be initiated by the robotic device and can include a computer local to the robotic device communicating and collaborating with the cloud server resulting in the updated policy. The computer local to the robotic device can initiate the task based on the updated policy, and the robotic device can perform the task in response to the computer local to the robotic device.

In another example, the computer local to the robotic device can initiate the task using AI analysis of data provided by the sensor array at the location, and the sensor array can include environmental data at the location. In another example, the task is not initiated in response to the control system. In another example, the environmental data can include an environmental condition. In another example, the threshold for determining quality includes a measured level of electronic noise which is acceptable for quality, and thereby when the received data exceeds the threshold, and the received data is unacceptable in relation to quality. In another example, the location where the robotic device is operating can have low quality electronic wireless communication capabilities, e.g., sub-optimal electronic wireless communication capabilities.

In another example, the cloud server can have increased communication capabilities with the robot at the location in comparison to the control system.

In another example, the method includes receiving data at the cloud system from the robot, and the received data at the cloud system can meet the threshold for determining quality of the data.

Referring to FIG. 4A, in another embodiment according to the present disclosure a method 400 can continue from block 220 of the method 200 shown in FIG. 2, and the method 400 includes Initiating a task by the robotic device, including a computer local to the robotic device communicating and collaborating with the cloud server, resulting in the updated policy, as in block 404.

The method 400 includes initiating the task based on the updated policy using the computer local to the robotic device, as in block 406. The method includes the robotic device performing the task in response to the computer local to the robotic device, as in block 408.

Referring to FIG. 4B, in another embodiment according to the present disclosure a method 450 can continue from block 220 of the method 200 shown in FIG. 2, and the method 450 includes updating the model, using the computer, the updated model includes updating the received data, as in block 454. The method 450 includes updating the analyzing of the data, as in block 456. The method 450 includes secondly communicating with the cloud server to collaborate in another updating of the policy for choosing navigation action, in response to the updated received data not meeting the threshold for determining quality, as in block 458. The method can further include iteratively updating the updated notification based detecting a change of a parameter of the event.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 150 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for entities such as users, participants, operators, human operators, or robotic devices. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5:
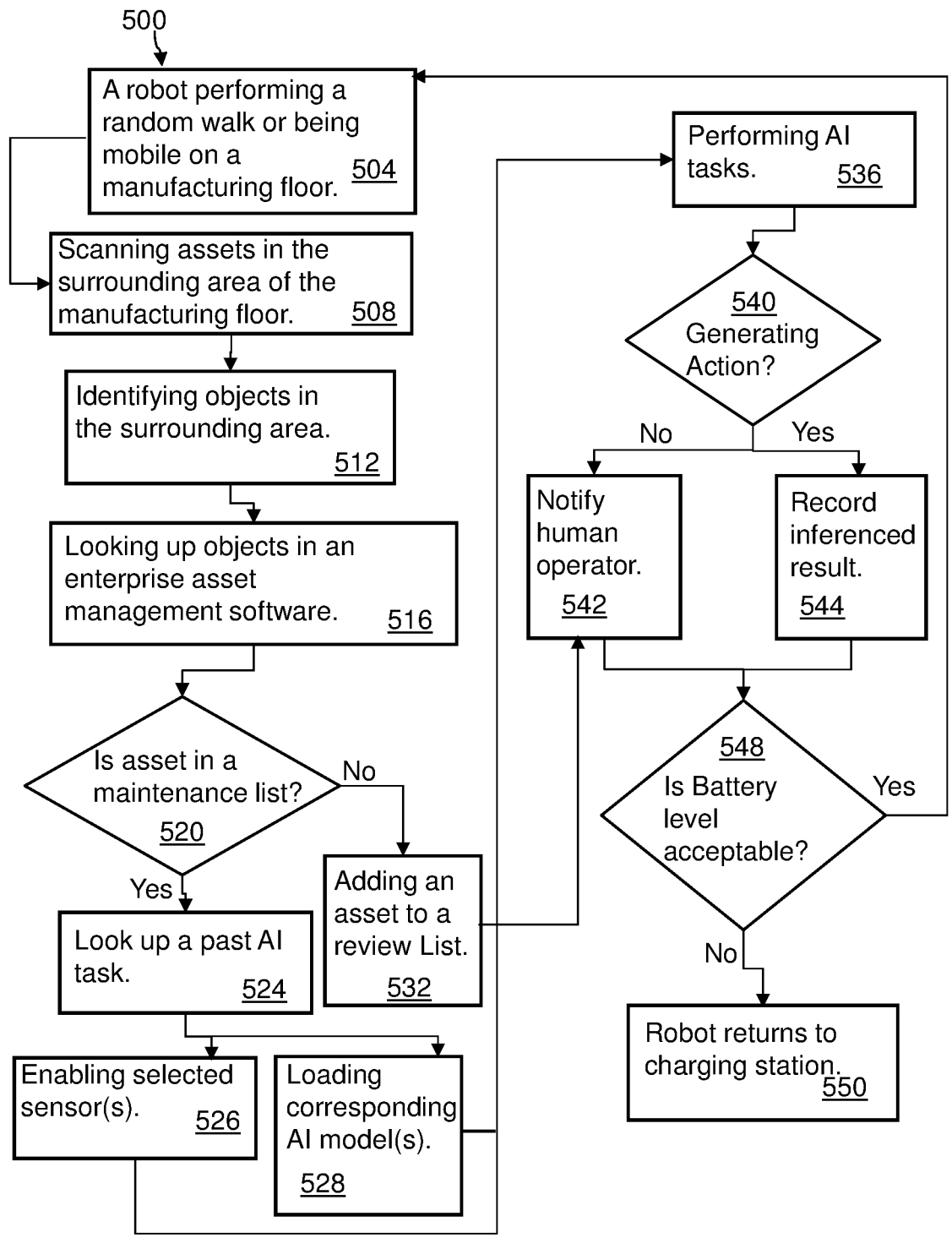
FIG. 5 is a flow chart illustrating another method according to an embodiment of the present invention, for an autonomous roaming robotic device to dynamically adjust sensors and models for implementing actions using artificial intelligence (AI), including an AI model and data analysis.

Generally referring to FIG. 5, in one embodiment according to the present disclosure, a system and method 500 can provide flexibility for a robotic device (also referred to as a robot) that is equipped with multiple sensors to perform multiple AI workloads within the same trip. The present disclosure can include a method to allow the robot to dynamically switch to use different sensors and run different AI workloads as needed. The robot can determine what sensors to use and corresponding AI models to use for inferencing (e.g., procedures, instruction) by itself. Thereby, methods and systems of the present disclosure can include using an AI enabled robotic device to perform a mission using different sensors and associated AI models, providing an intelligent robot able to determine what sensors to use by itself adjusting dynamically to a target rich environment, e.g., assets or items. Thus, the robot can dynamically adjust to a target rich environment, and not be limited to a preprogramed mission or task having a limited scope of data capture.

In embodiments of the present disclosure, the robot can execute freely by itself without any pre-defined mission, for example, locally determine a course of action and/or determine action for the robot in detecting and gathering information, and initiate a course of action. Thus, the robot is autonomous. In one example, the robot has the ability to detect objects nearby, and can identify whether the objects are assets/equipment that require maintenance by querying historical data of the asset catalog, and find out what kind of inspections were being done in the past. The robot can carry out appropriate follow-up actions based on the inspection result. Thereby, there is no need for a human operator to tell the robot which mission to carry out.

In one example, the robot has the ability to load and run multiple AI models by itself without any human operator's predefined mission.

In another example, embodiments of the present disclosure can include a robotic device including multiple sensors such as a PTZ (pan, tilt, zoom) camera, an infrared camera, a lidar camera, a microphone, etc., that are mounted onto the robot. A GPU (graphics processing unit) payload server can compute capability. Multiple AI models such as visual inspection model, acoustic model, thermal models, time series models, etc., can be loaded on the payload server. A program can be loaded on the payload server to help the robot to make a decision in real time including which sensor to use and what AI model to run. The program can include component including the following. An inbound component to capture the data from the robot's sensors. A pre-processing component to process any data if needed before sending the data to the AI model. An AI workload component to contain various AI models and libraries needed to run the models such as visual inspection model, an acoustic inspection model, a thermal inspection model, or a time series analysis, etc. A post-processing component to process the inferenced result from the AI model in a desirable format. An outbound component to perform appropriate alerts or actions based on the inferenced results, for example, send an alert to a human. An orchestration component to provide basic operation logic to assist the robots to make decisions of which sensor and AI model to use.

More specifically referring to FIG. 5, in one example, a method and system according to the present disclosure can include a robot or robotic device engaged on a manufacturing floor. The method 500 includes a robot performing a random walk or being mobile on a manufacturing floor, as in block 504.

The method 500 shown in FIG. 5, includes the robot scanning assets in the surrounding area of the manufacturing floor, as in block 508. For example, the robot can take a picture with a camera while on the manufacturing floor, as in block 508. For example, the robot can be walking or moving by another means such as rolling.

The method 500 can include the robot identifying objects in the surrounding area, as in block 512. In one example, the robot can be equipped with an object recognition model. Through object recognition, the robot identifies assets that are in the surrounding area. For example, the manufacturing floor can include an electrical transformer, a fire extinguisher and a HVAC unit, two humans (e.g., human operators or manufacturing personnel), a table and two chairs. In another embodiment, the robot can detect its own location with respect to a site map. If the site map includes the location of the assets, the robot can easily tell the nearby assets without using the object recognition model. The robot can exclude the humans as they are not assets/equipment.

The method includes looking up objects in enterprise asset management (EAM) software, as in block 516. For example, the robot can look up a maintenance list from an enterprise asset management system.

The method includes determining if an asset is in the maintenance list in block 520. If not, the method can continue to adding the asset to a review list, as in block 532, and then proceed to notify a human operator at block 542. When the asset is in the maintenance list at block 520, the method can look up a past AI task, at block 524. The method can continue to enable selected sensor(s), as in block 526 and load a corresponding AI model(s) at block 528.

For example, the robot can identify objects (electric transformer, fire extinguisher and a HVAC) that are assets from the maintenance list. For each asset that is near the robot; the robot can query historical data of the asset management system to know the type of inspections which were performed on the assets nearby. For instance, the fire extinguisher had visual inspection in the past, the transformer had thermal inspections and the had acoustic inspection.

The method can include performing an AI task, as in block 536. In one example, the method includes the robot performing an AI enabled task, for example, an inspection. For example, for each asset that is near the robot, the robot performs the right inspections based on the historical inspections. In one example; the robot can enable the right sensor; load the correct AI model in run time if it is different from what is loaded on the robot; capture the data with the sensor; perform the inference on the selected AI model; capture the inference result of the inspection; and generate an alert if needed.

In one example, when the asset is not listed in the maintenance list of the asset catalog (at block 520), the robot can add the asset to a temporary list, as in block 532, and the robot can notify a human operator (as in block 542) of these new assets later.

The method 500 includes generating an action 540 which can include activating a sensor, such as a camera, and capturing data, such as a picture. When there is not a next action at block 540, the method can notify a human operator 542. When there is a next action at block 540, the method can record an inferenced result, as in block 544.

For example, the method can include the robot switches to different sensors and AI models if needed until the assets nearby are inspected. In a situation where the same asset has different type of inspections performed etc., for example, the HVAC had visual inspection done for the last three years and acoustic inspections were done last year. The robot can compare the result of different AI models and see which one has a better performance/accuracy. The robot will select the sensor and AI model that performs better for the asset. The robot can continue to move, e.g., walk, and continue to perform inspections of assets nearby until its battery has to be recharged.

The method can include proceeding to determine if a batter level is acceptable, as in block 548. When the battery level is acceptable at block 548, the method can return to block 504. When the battery level is not acceptable at block 548, the robot can return to a charging station at block 550 to charge its battery.

Figure 6:
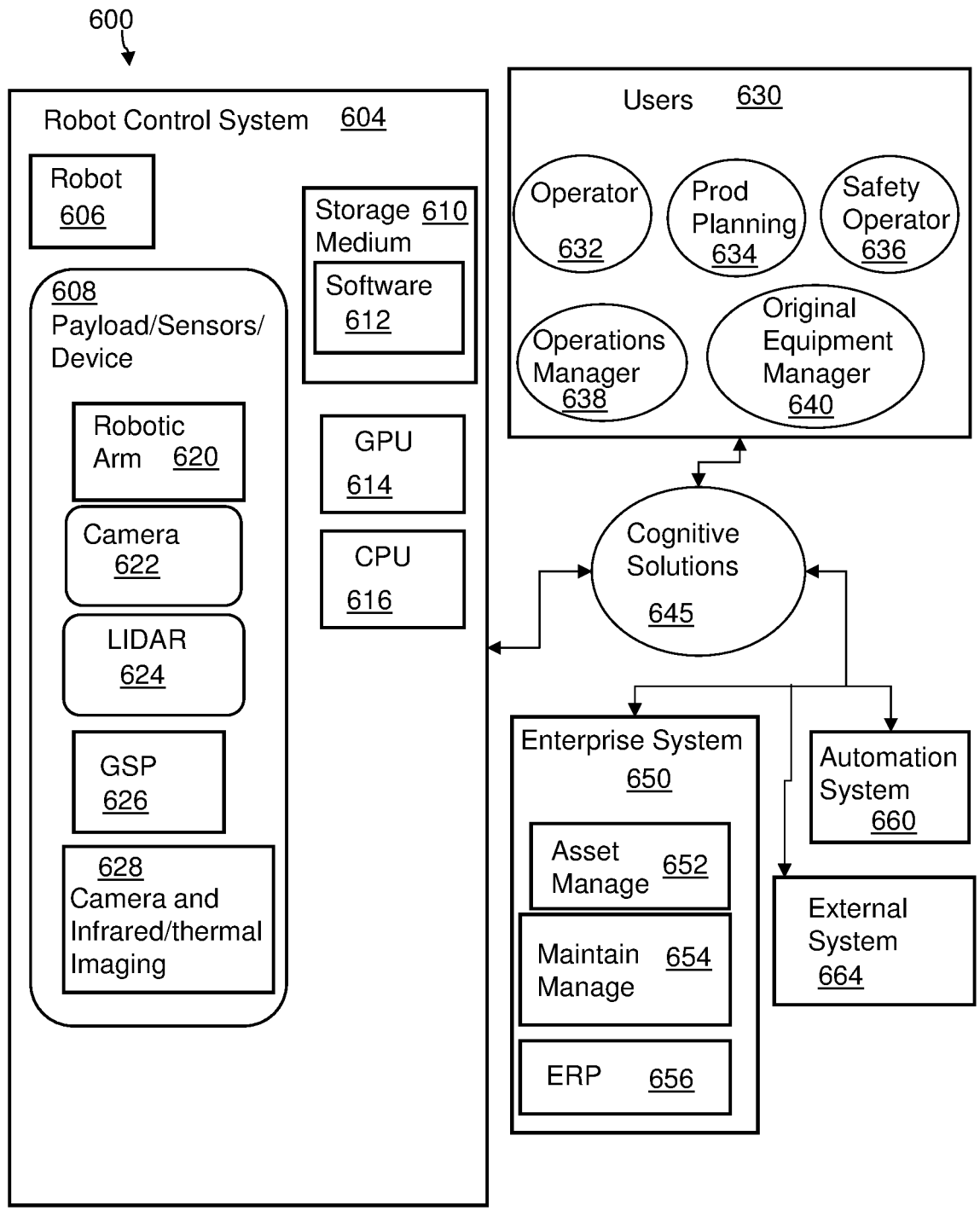
FIG. 6 is a block diagram illustrating another system according to an embodiment of the present invention, for an autonomous roaming robotic device to dynamically adjust sensors and models for implementing actions using artificial intelligence (AI), including an AI model and data analysis.
Figure 7:
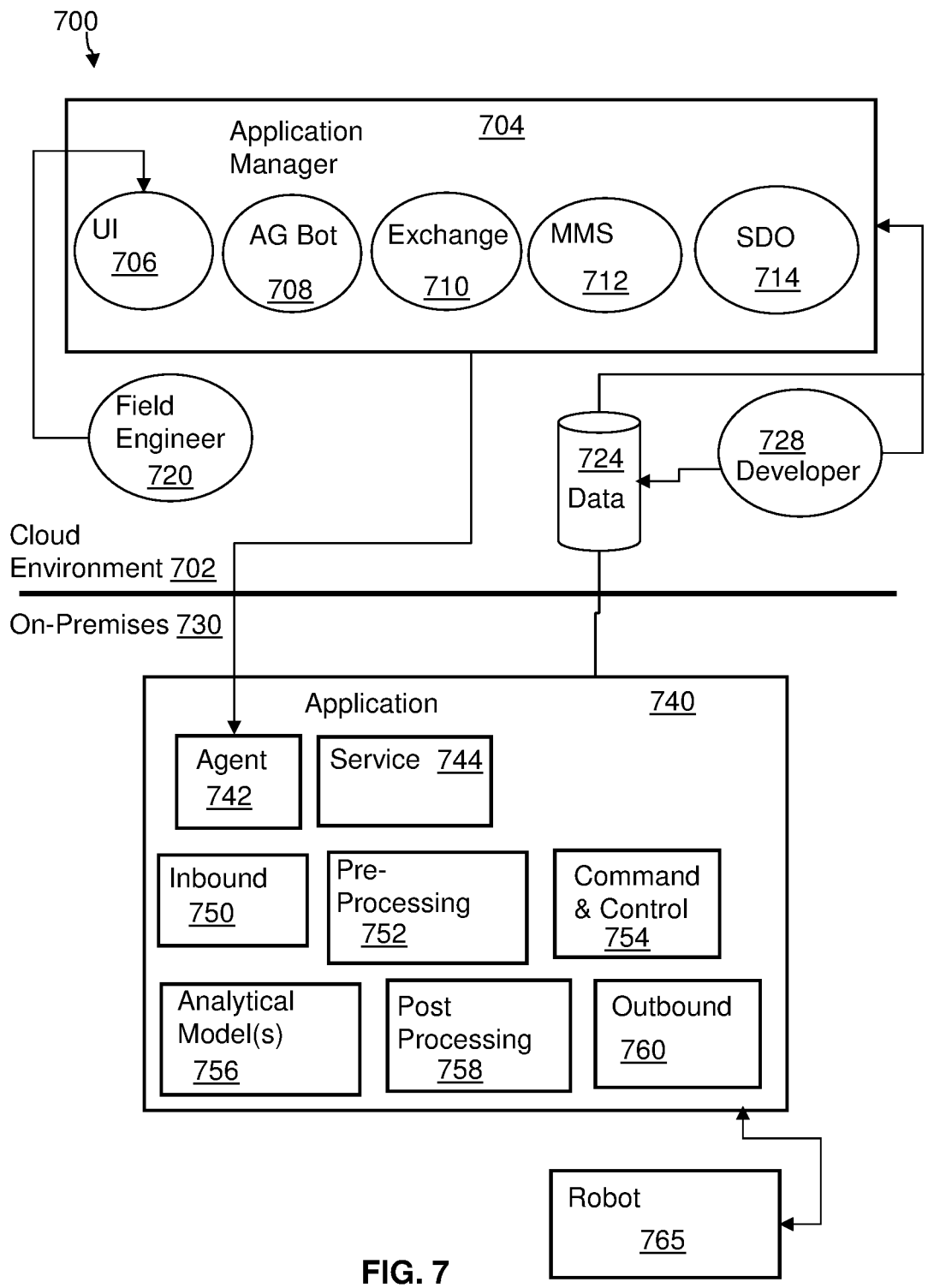
FIG. 7 is a block diagram illustrating another system according to an embodiment of the present invention, for an autonomous roaming robotic device to dynamically adjust sensors and models for implementing actions using artificial intelligence (AI), including an AI model and data analysis.

Referring generally to FIGS. 6 and 7, a system 600 according to the present disclosure includes a robot control system 604 including a robot 606, which can deliver a payload or gather data using sensors or a device 608, and a computer readable storage medium 610 having software 612 embedding therein for executing programming instruction for the robot. The system 604 including a graphics processing unit (GPU) 614 and a central processing unit (CPU) 616. The devices 608 include a robotic arm 620, a camera 622, LIDAR (light detection and ranging) 624, a graphics system processor (GSP) 626, and a camera and infrared (IR)/thermal imaging system. An infrared light can be used to illuminate an area of interest.

Users 630 of the robotic device can include an operator 632, production planning personnel 634, a safety operator 636, an operations manager 638, or an original equipment manager 640. A cognitive solution using cognitive analysis enables the system 600 to provide solutions using the components depicted herein. An enterprise system 650 includes an asset management component 652, a maintenance management component 654, and an enterprise resource management (ERP) component 656. The system 600 includes an automation system, 660 and external systems 664. The automation system can include a building automation system (BAS), building management system (BMD), or building information modeling (BIM). The external systems can include a weather system or a map system.

Components for the system 600 can also include a catalog of assets kept in asset management system. For each asset, the management system can include historical data of AI pipeline/tasks of the inspections that defines which sensor(s) and AI model(s) were used, as well as follow up actions (such as alerts or creation of work order). A robot can be equipped with multiple sensors, a payload server, multiple AI models, a Smart Edge solution as described above. An AI model training environment can include a development environment for data scientist to create different AI models before they are deployed in an edge side (that is, onto the robot). Wi-Fi connectivity can allow the robot to query the asset management system for asset info and historical AI tasks. In another embodiment, the robot can be placed in a new facility to perform inspections by itself without any predefined missions by a human operator as it has the ability to inference assets of the same kind to be applied with the same type of machine learning model(s) and sensor(s).

In another example according to the present disclosure, a management system 700 include an application manager 704, which can be in a cloud computing environment 702, which includes a UI (user interface) 706, an Agbot (agricultural robot) 708, and exchange 710, an MMS (Multimedia Messaging Service) 712, and a SDO (standards development organization) 714. A field engineer 720 can access the UI 706 to register a robot. A developer 728 can define policy and service for the robot. The developer can use a push container to record data 724 in a registry in a database. A location, e.g., a premises 730 where the robot operates, can include an application 740 stored on the robot 765, and the application receiving input from the application manager 704. The application includes an agent 742, and a service 744 providing input to a number of processes. The application 740 includes inbound data 750, preprocessing 752, command and control 754, analytical models 756, post processing 758 and outbound data 760.

More Examples and Embodiments

Thereby, a method and system according to the present disclosure, in light of embodiments and examples described herein, can include switching AI models if two or more assets of different kinds of inspections are performed. At a high level, a robot can receive instructions to investigate assets of an area, and the robot can identify a first asset and look up historical data of what inspection was performed. Based on the historical information, the robot can enable one of more sensors and select an AI model that leverages the selected sensors for inspection, and complete the inspection. The robot can continue to identify other assets or second assets in an area. Identification of an asset can be completed by running an object detection AI model. The robots can look up historical data of the second asset. The robot can enable one or more sensors and select a second AI model if the type of inspection performed on the second asset was different from the type of inspection performed on the first asset. The robot can perform an inspection with the selected second AI model and the selected sensors. The robot continues to scan assets in the area and performs inspections until all the assets of the area are inspected. In one example, the switching of the AI model can be performed on the robot's computer, or it can be done on an external server that the robot communicates with.

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 8:
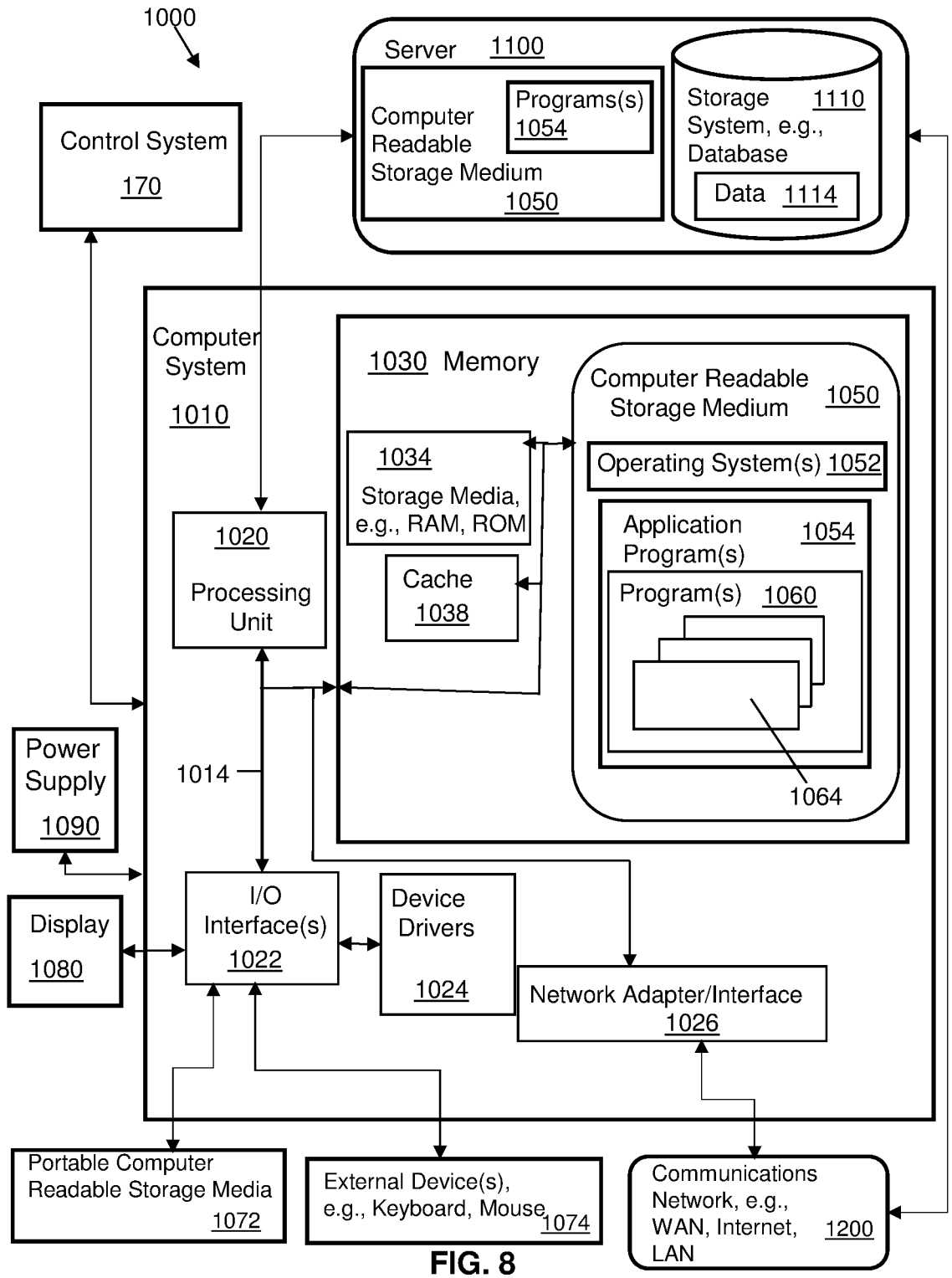
FIG. 8 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 8). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 8 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 8 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure.

An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or more AI ecosystems or environments.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 8, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to as non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. A power supply 1090 can also connect to the computer using an electrical power supply interface (not shown). Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 9:
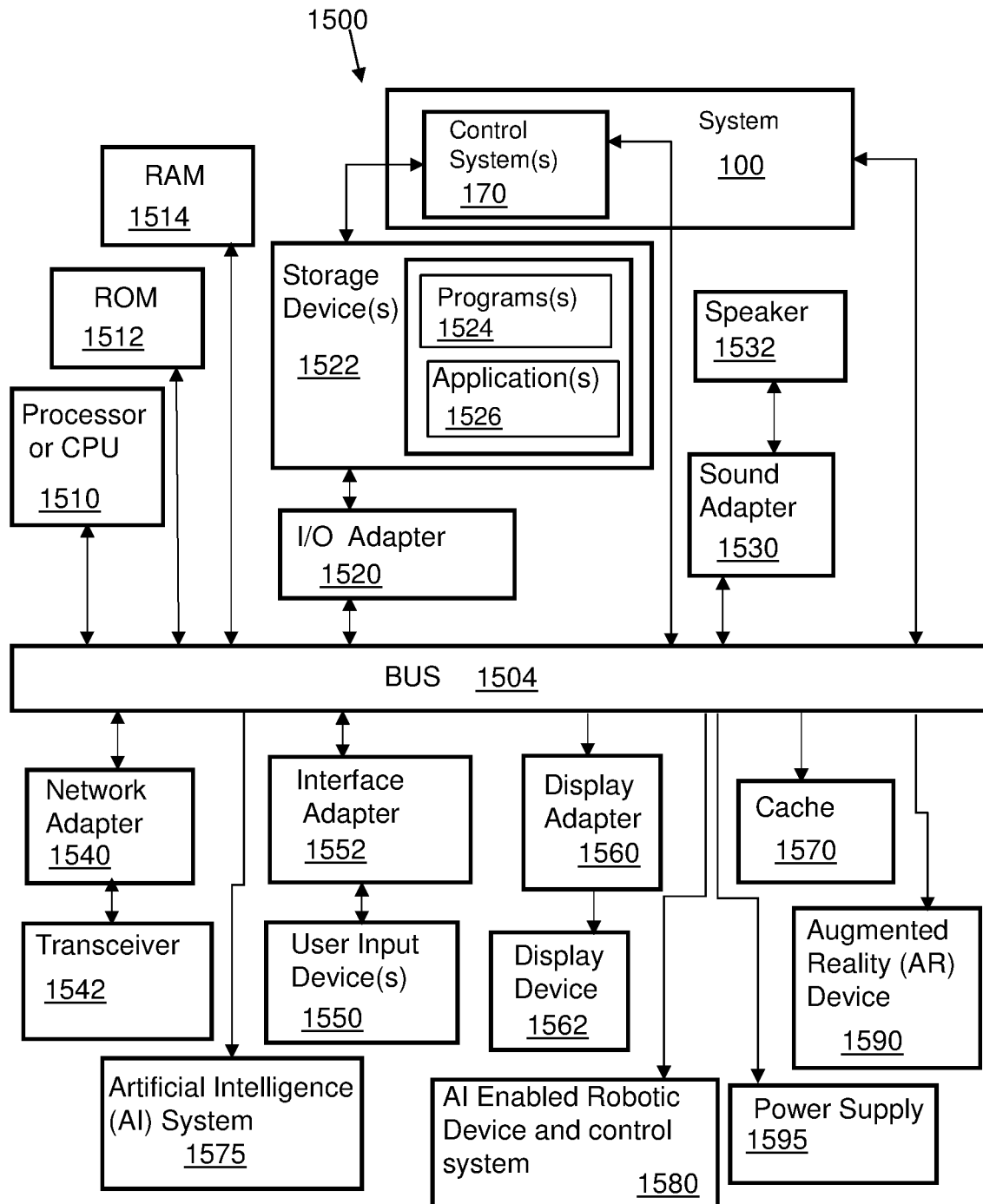
FIG. 9 is a schematic block diagram of a system depicting system components interconnected using a bus. The components for use, in all or in part, with the embodiments of the present disclosure, in accordance with one or more embodiments of the present disclosure.

Referring to FIG. 9, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1580 can also be operatively coupled to the bus 1504. An AI enabled robotic device and control system 1580 can also be operatively coupled to the bus 1504. Such a robot and control system 1580 can incorporate all or part of embodiments of the present disclosure and discussed hereinbefore. An artificial intelligence (AI) system 1575 or an AI ecosystem can also be operatively coupled to the bus 1504. A power supply 1595 can also be operatively connected to the bus 1504 for providing power to components and for functions according to the present disclosure. An augmented reality (AR) device 1590 can also be operatively connected to the bus 1504 for providing augmented reality output to a wearable augmented reality device, such as AR glasses or an AR headset.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which is part of the system 100 (described in further detail hereinbefore) and can communicate with the system bus independently or as part of the system 100, and thus can communicate with the other components of the system 1500 via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
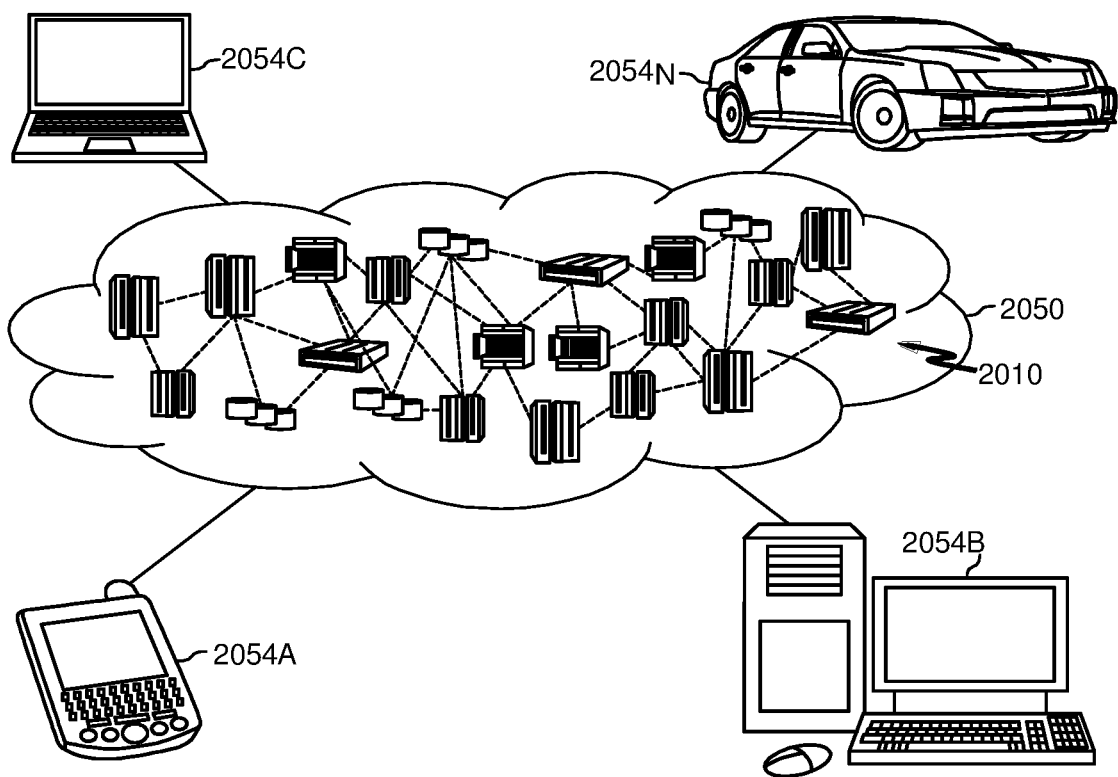
FIG. 10 is a block diagram depicting a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
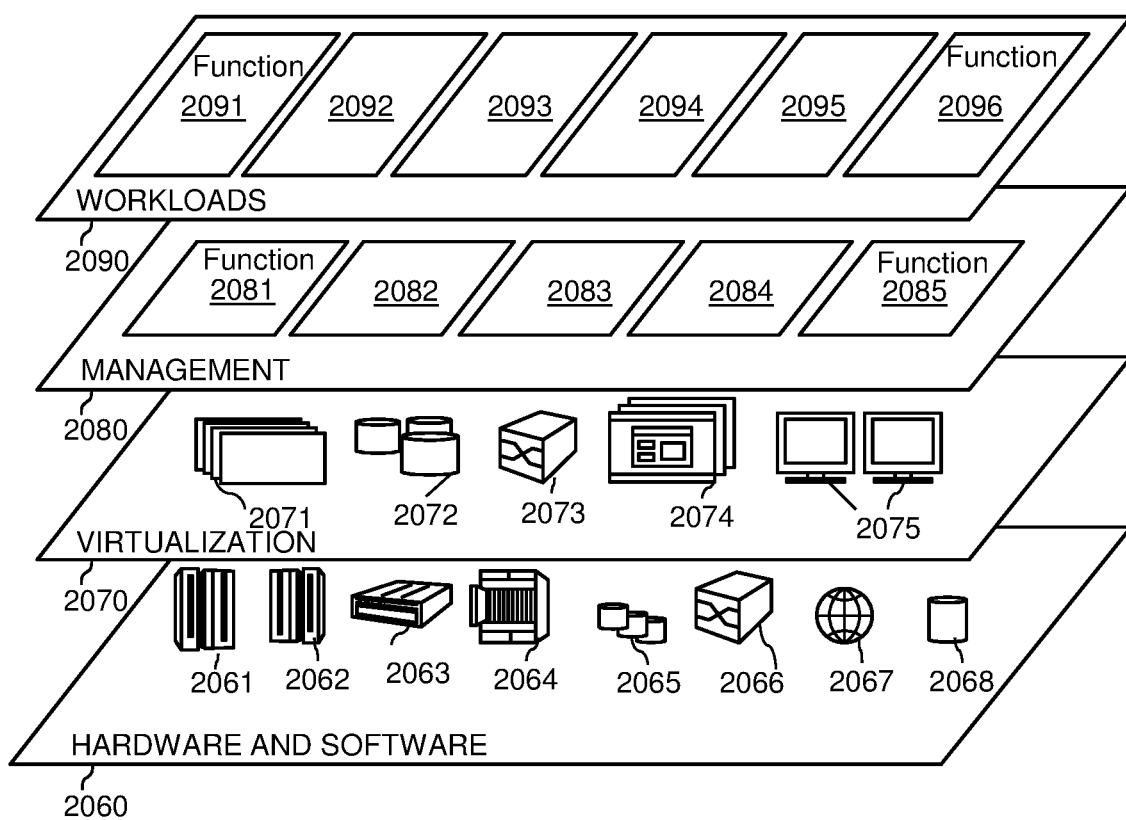
FIG. 11 is a block diagram depicting abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized.

Examples of workloads and functions which may be provided from this layer include: mapping and navigation 2091; software development and lifecycle management 2092; virtual classroom education delivery 2093; data analytics processing 2094; transaction processing 2095; and managing an artificial intelligence enabled robotic device 2096, for example, managing a roaming robotic device using a control system.

What is claimed is:

1. A computer-implemented method for an autonomous roaming robotic device to dynamically adjust sensors and models for implementing actions using artificial intelligence (AI), comprising:
   receiving data regarding an asset at a computer of a roaming robotic device from one or more sensors of a plurality of sensors on the robotic device, in response to an identification of the asset at a location using the one or more sensors, the robotic device having instructions, received from a control system, to inspect the location or items at the location;
   analyzing the received data and historical data for the asset, using the computer of the robotic device, to reference relevant inspection instructions and an inspection history for the asset;
   selecting a sensor of the plurality of sensors, using the computer of the robotic device, based on the analysis of the received data and the historical data;
   loading an AI model using the computer of the robotic device, based on the identification of the asset and the analysis of the data and the historical data; and
   conducting an asset inspection based on the AI model using the selected sensor to generate asset inspection data.

2. The method of claim 1, further comprising:
   analyzing a plurality of AI models for applicability to the asset;
   selecting the AI model of the plurality of models based on the identification of the asset and the analysis of the data and the analysis of the plurality of AI models;
   loading the selected AI model using the computer of the robotic device; and
   using the selected AI model and the selected sensor, the conducting of the asset inspection being performed.

3. The method of claim 1, wherein the AI model includes an inspection protocol for the asset.

4. The method of claim 1, further comprising:
   selecting a sensor of the plurality of sensors, using the computer of the robotic device, for conducting an inspection of the asset based on the AI model; and
   performing an asset inspection using the selected sensor to generate asset inspection data, based on the AI model for the asset.

5. The method of claim 1, further comprising:
   determining an action with respect to the asset based on the asset inspection data; and
   communicating the action to the control system.

6. The method of claim 1, wherein the inspection protocol includes an inspection type, and an inspection action particular to the inspection type.

7. The method of claim 1, further comprising:
   analyzing the asset inspection data from the asset inspection using the computer of the robotic device; and
   determining a next action based on the analysis of the asset inspection data.

8. The method of claim 7, further comprising:
   initiating the next action at the robotic device, the next action including a second sensor of the plurality of sensors on the robotic device.

9. The method of claim 8, further comprising:
   enabling a third sensor of the plurality of sensors based on a type of the asset;
   loading a related AI model input for the type of the asset for the generation of the AI model;
   capturing the inspection data with the third sensor;
   analyzing the inspection data to determine another action based on the analysis of the asset inspection data; and
   initiating the next action at the robotic device, the next action including a second sensor of the plurality of sensors on the robotic device.

10. The method of claim 1, further comprising:
    identifying a plurality of assets for inspection by the robotic device;
    identifying an AI model from a plurality of AI models corresponding to each of the plurality of identified assets;
    receiving data regarding each of the assets, respectively;
    analyzing the received data for each of the assets, respectively;
    selecting a sensor for each of the assets, respectively;
    loading an AI model for each of the assets, respectively; and
    conducting an asset inspection for each of the assets, respectively.

11. The method of claim 1, wherein the selection of the sensor is performed by the computer of the robotic device without instructions from the control system regarding the selection.

12. The method of claim 1, wherein the computer of the robotic device initiates the conducting of the asset inspection based on an inspection protocol derived from the AI model, the conducting of the asset inspection by the robotic device being in response to the computer of the robotic device.

13. The method of claim 1, wherein the computer of the robotic device initiates the performance of the conducting of the asset inspection in response to the AI model.

14. The method of claim 1, wherein the selection of the sensor and the conducting of the asset inspection is not initiated in response to the control system.

15. The method of claim 1, further comprising:
    identifying a second asset at the location using the one or more sensors of the plurality of sensors on the roaming robotic device;
    receiving data at the computer of the robotic device from the one or more sensors regarding the second asset, in response to the identification of the second asset at the location;
    analyzing the second data using the computer wherein the analysis includes using historical data for the second asset;
    generating another AI model based on the identification of the second asset, using the analysis of the second data;
    analyzing the another AI model to generate a second inspection protocol for the second asset;
    selecting a second sensor from the plurality of sensors for initiating the inspection of the second asset based on the second inspection protocol;
    perform a second asset inspection using the selected second sensor to generate second asset inspection data;
    determining a second action with respect to the second asset based on the second asset inspection data; and
    communicating the second action to the control system.

16. The method of claim 1, wherein the action includes an alert regarding the asset.

17. The method of claim 1, wherein the action including a communication to a device of a person.

18. The method of claim 1, wherein the action including a maintenance activity for the asset.

19. A system for an autonomous roaming robotic device to dynamically adjust sensors and models for implementing actions using artificial intelligence (AI), which comprises:
- a computer system comprising; a computer processor, a computer-readable storage medium, and program instructions stored on the computer-readable storage medium being executable by the processor, to cause the computer system to perform the following functions to;
- receive data regarding an asset at a computer of a roaming robotic device from one or more sensors of a plurality of sensors on the robotic device, in response to an identification of the asset at a location using the one or more sensors, the robotic device having instructions, received from a control system, to inspect the location or items at the location;
- analyze the received data and historical data for the asset, using the computer of the robotic device, to reference relevant inspection instructions and an inspection history for the asset;
- select a sensor of the plurality of sensors, using the computer of the robotic device, based on the analysis of the received data and the historical data;
- load an AI model using the computer of the robotic device, based on the identification of the asset and the analysis of the data and the historical data; and
- conduct an asset inspection based on the AI model using the selected sensor to generate asset inspection data.

20. A computer program product for an autonomous roaming robotic device to dynamically adjust sensors and models for implementing actions using artificial intelligence (AI), the computer program product comprising a computer readable storage medium having program instructions embodied therewith, the program instructions executable by a computer to cause the computer to perform functions, by the computer, comprising the functions to;
- receive data regarding an asset at a computer of a roaming robotic device from one or more sensors of a plurality of sensors on the robotic device, in response to an identification of the asset at a location using the one or more sensors, the robotic device having instructions, received from a control system, to inspect the location or items at the location;
- analyze the received data and historical data for the asset, using the computer of the robotic device, to reference relevant inspection instructions and an inspection history for the asset;
- select a sensor of the plurality of sensors, using the computer of the robotic device, based on the analysis of the received data and the historical data;
- load an AI model using the computer of the robotic device, based on the identification of the asset and the analysis of the data and the historical data; and
- conduct an asset inspection based on the AI model using the selected sensor to generate asset inspection data.

* * * * *